No. 804,802. PATENTED NOV. 14, 1905.
W. F. FOLMER.
CAMERA.
APPLICATION FILED APR. 27, 1904.
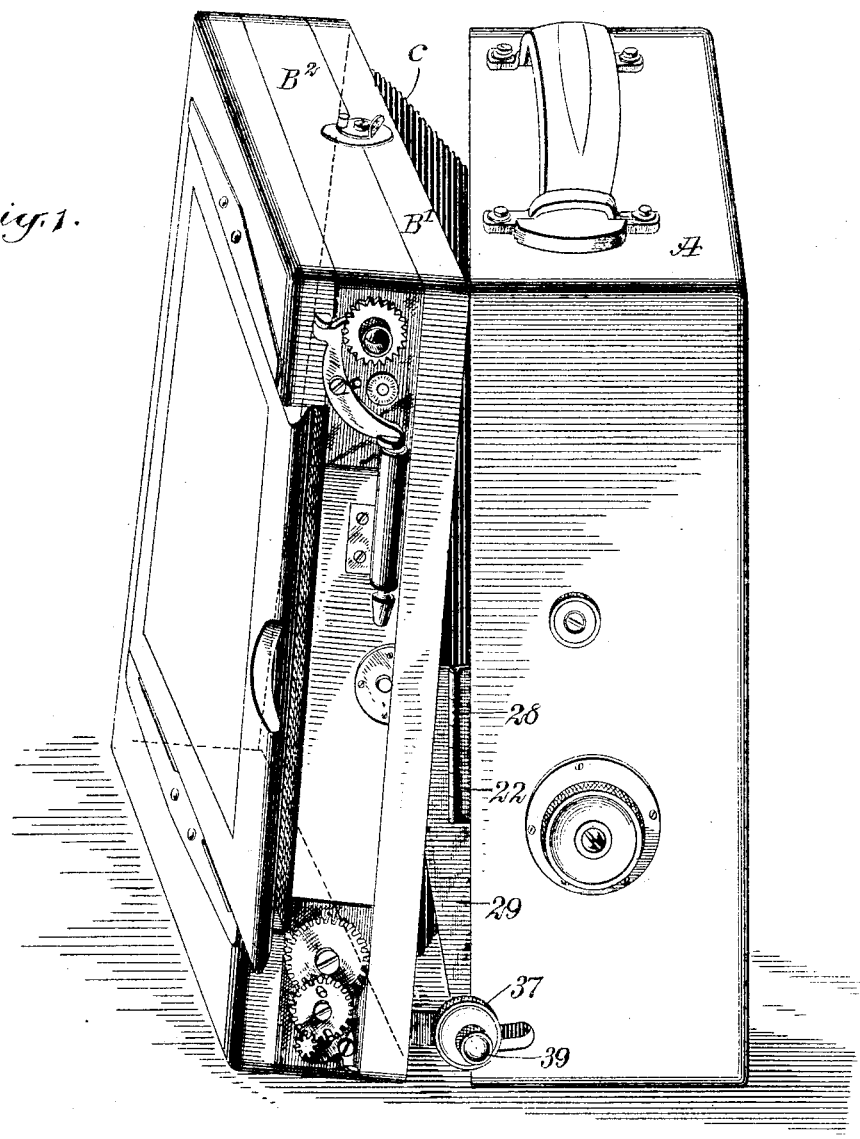
WITNESSES:
INVENTOR
William F. Folmer
BY
ATTORNEYS No. 804,802. PATENTED NOV. 14, 1905.
W. F. FOLMER.
CAMERA.
APPLICATION FILED APR. 27, 1904.
3 SHEETS—SHEET 2.
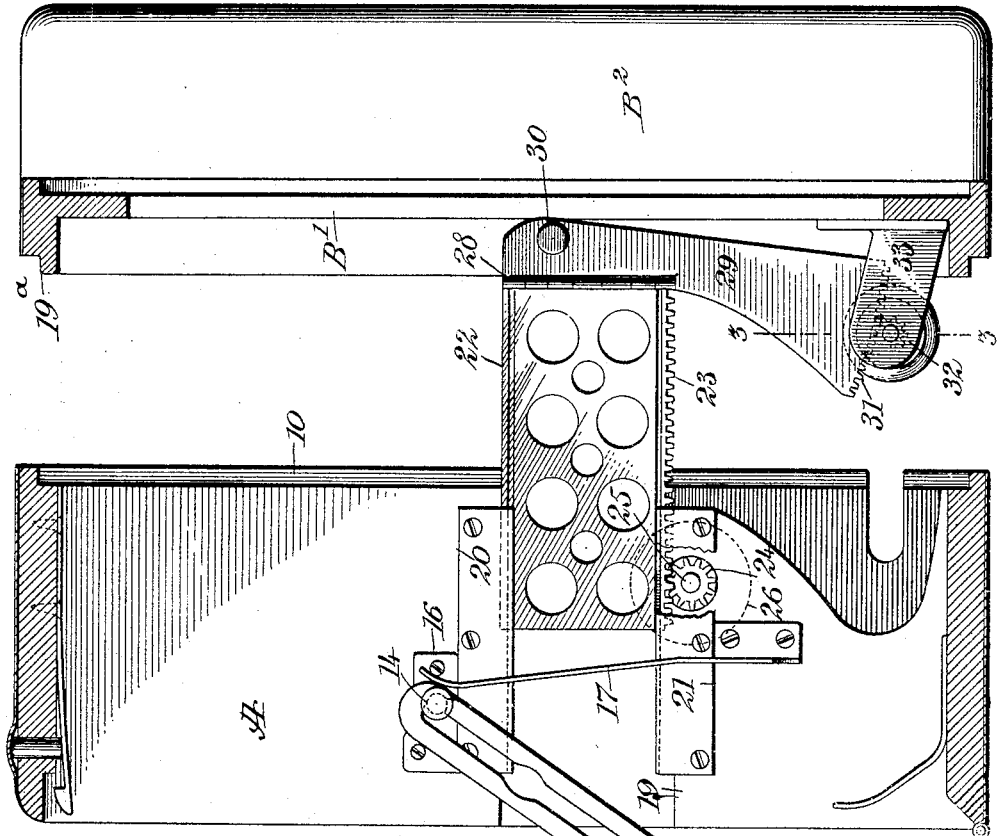
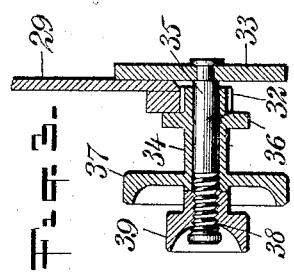
WITNESSES:
Geo. W. Naylor
J. Redecker
INVENTOR
William F. Folmer
BY
ATTORNEYS No. 804,802. PATENTED NOV. 14, 1905.
W. F. FOLMER.
CAMERA.
APPLICATION FILED APR. 27, 1904.
3 SHEETS—SHEET 3.

WITNESSES:
Geo. W. Naylor.

INVENTOR
William F. Folmer
BY
ATTORNEYS

UNITED STATES PATENT OFFICE.

WILLIAM F. FOLMER, OF NEW YORK, N. Y., ASSIGNOR TO FOLMER & SCHWING MFG. COMPANY, OF NEW YORK, N. Y., A CORPORATION OF NEW JERSEY.

CAMERA.

No. 804,802.  Specification of Letters Patent.  Patented Nov. 14, 1905.

Application filed April 27, 1904. Serial No. 205,075.

*To all whom it may concern:*

Be it known that I, WILLIAM F. FOLMER, a citizen of the United States, and a resident of the city of New York, borough of Manhattan, in the county and State of New York, have invented a new and Improved Camera, of which the following is a full, clear, and exact description.

The purpose of the invention is to provide a camera with a rear extension frame or back from the camera-box, adapted to carry a plate-holder and focal-plane shutter, if such is used, and to connect the extension-frame with the camera-box in such a manner that the frame may be capable of adjustment to or from the box not only vertically and laterally, as in the usual camera swing-back, but also by specially-constructed lateral or side arms and attachment thereto to secure an adjustment along the diagonal axis of the focusing plane of the extension-frame, whereby in certain special situations a more correct rendering of perspectives without foreshortening is obtainable than in ordinary adjustments. Means are provided for securing the extension-frame in any position to which it is adjusted, and a bellows extends from the front of the frame to the rear of the camera-box.

The invention consists in the novel construction and combination of the several parts, as will be hereinafter fully set forth, and pointed out in the claims.

Reference is to be had to the accompanying drawings, forming part of this specification, in which similar characters of reference indicate corresponding parts in all figures.

Figure 4:
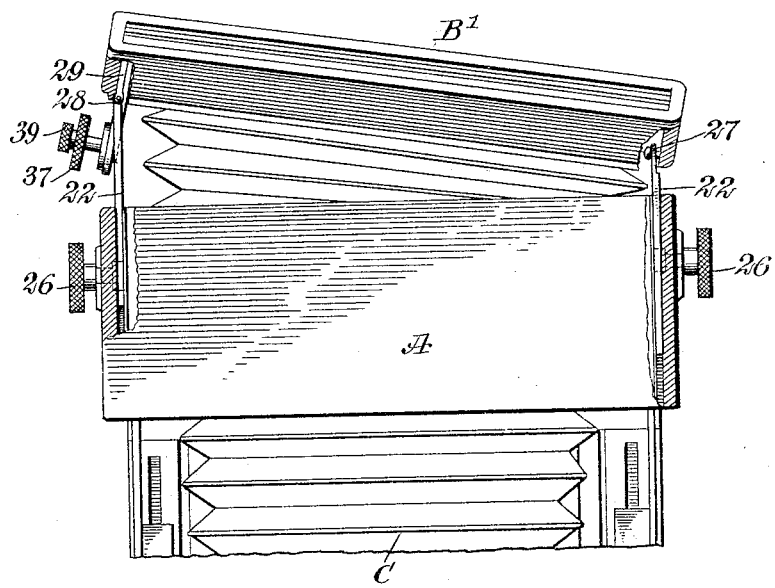
Figure 5:
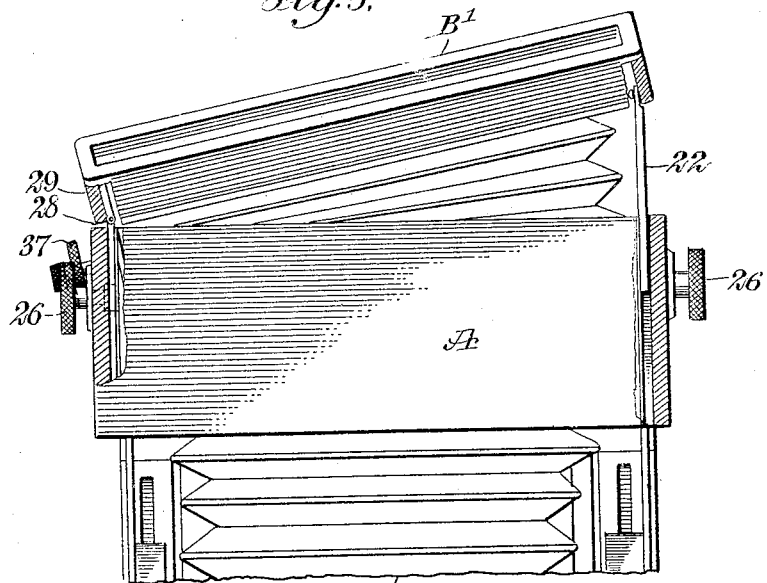

Figure 1 is a perspective view of the camera-box and extension frame or back, showing the diagonal and angular position of the extension-frame. The dotted lines indicate the position of the opposite sides and corners of the extension-frame. Fig. 2 is an enlarged view illustrating the box in vertical section and likewise the extension-frame, and the focal-plane shutter in end view, and the said figure likewise shows the adjusting mechanism for the extension-frame in side elevation. Fig. 3 is a section taken practically on the line 3 3 of Fig. 2. Fig. 4 is a plan view, partly in section, of the camera in an open position, parts being broken away and showing the bellows and the extension-frame adjusted at an angle to the back of the box; and Fig. 5 is a similar view, showing the bellows and extension-frame adjusted at an angle to the box, the reverse of that shown in Fig. 4.

A represents the camera-box, which primarily is open at the front and back, being provided at its rear edge with a rabbet 10, as shown in Fig. 2.

B represents the usual hinged front of the box, which is adjusted to the horizontal position and secured by slotted side bars 11, engaging pins 14 on the box, the bars being held in engagement with the pins by springs 17. When B is in the said horizontal position, it forms the bed of the camera, over which the usual lens-support is drawn out to the approximate focusing position, as is customary in cameras of this character.

Slideways 20 and 21 are secured in parallel relation, one above the other, at the inner face of each side of the camera-box A, and in these slideways plates 22 have movement in direction of the front and the rear of the said box, and where the plates move in the box A suitable recesses 19 are made, as is shown in Fig. 2, and the ways 20 and 21 are adjacent to the upper and lower edges of these recesses. The plates 22 are provided with rack-teeth 23 at their lower edges, and these rack-teeth are engaged by pinions 24. These pinions are secured on spindles 25, which extend out beyond the sides of the box A and are provided with buttons 26 at their outer ends, whereby the pinions are turned so as to move the plates forward or rearward, as may be found necessary. These plates 22 are adapted to impart movement to an extension frame or back B', which is at the rear of the box A, and this extension-frame B' has a tongue $19^a$ at its forward edge, adapted to enter the rabbet 10 in the box A when the extension-frame is brought in close relation to the said box, so as to render the connection between the two more rigid. This frame B' is adapted to receive a plate-holder, or, as illustrated, is adapted to be attached to the focal-plane shutter $B^2$, which has the usual provision to receive the plate-holder, and the said focal-plane shutter may be of any suitable or approved construction. The inner end of the bellows C is attached to the extension-frame B', as is shown in Figs. 1, 4, and 5, and has suitable play within the box A. The left-hand plate 22 is loosely pivoted at its rear end to the inner side portion of the extension-frame B', as is shown in Fig. 4, and the said plate 22 has sufficient play upon its pivot-pin 27, which is secured to the extension-frame, as to enable the said extension-frame to be carried at different angles to the box A. The right-hand adjusting-plate 22, as shown in Fig. 2, is provided with a hinge 28 near its rear portion, the part beyond the hinge being connected with and forming part of a segment 29 of peculiar shape. Segment 29 is connected and pivoted near its upper end to the right-hand inner face of the extension-frame B′ by a pin 30. Teeth 31 are produced in the lower or under end of segment 29, engaged by a pinion 32, which is secured to a tube 34, mounted to turn upon a spindle 35, and the said spindle is carried by a bracket 33, which extends from the outer face of the extension-frame B′ at its lower right-hand portion. By way of further explanation of the movements obtainable by this construction it will be observed that the extension-frame B′, supported by extension-plates 22 and carrying segment 29, can be adjusted to any desired lateral angle to or from the body A by operating the spindles 25 respectively, either together or separately. If the left-hand plate 22 is drawn inward by the rotation of the spindle 25 until the left end of the extension-frame B′ closely approaches the body A, the interior of the extension-frame, as shown in Fig. 4, will assume an angle thereto on the pivot 27, while the hinge 28 in right-hand plate 22 will allow the right-hand end of said extension-frame B′ to assume a corresponding lateral angle away from the body A. If the right-hand end of extension-frame B′ is moved forward by operating the right-hand plate 22 with the spindle 25 until the said extension-frame closely approaches the body A and the left-hand plate 22 is moved outwardly by spindle 25, carrying said extension-frame B′ away from the body A, the left-hand plate 22 will assume an angle with reference to the interior left-hand end of said extension-frame B′ on pivot 27 just opposite to that previously described. The left-hand end of extension-frame B′ will be at a greater distance from the body A than the right-hand end and occupy a position similar to that shown in Fig. 5. The right-hand end of the extension-frame B′ will be nearer the body A, the angular adjustment being secured through hinge 28 in right-hand plate 22. It will thus be seen that the horizontal angular adjustment is secured on the right-hand end of extension-frame B′ in the hinge 28 of plate 22 and on the left-hand end of said frame through the plate 22 and pivot 27. The angular vertical adjustment of extension-frame B′ is obtained, in whatever horizontal angular position said frame may be, by rotating pinion 32 in either direction, which engaging with teeth 31 at the lower end of segment 29, carried on the extension-frame B′, causes the frame to tilt on its respective pivots 27 and 30 at any desired angle with reference to the body A.

Means for locking the operating-pinion 32 when the extension-frame is fixed at any desired vertical angle are provided. (Shown more particularly in Fig. 3.) The tubular carrier 34 for the pinion 32 is provided with a flange 36 adjacent to the pinion and adapted for frictional engagement with the segment 29 when it is desired that the pinion 32 shall not turn, and when the pinion 32 is operated by meshing with the teeth 31 of the segment 29 it will cause the said extension-frame B′ to be moved at an angle to the box in direction of the top or bottom of the latter, according to the direction in which the pinion 32 is turned, and the sleeve or tube 34 is turned, and consequently the pinion, through the medium of a button 37, which is secured to the outer end of the tube 34. The outer end of the spindle 35 is provided with a thread 38, and on the threaded portion of this spindle a nut 39 is located, which is carried in close relation to the button 37 when it is desired to hold the pinion 32 stationary, at which time the flange 36 is forced into firm and close contact with the segment 29.

Reference to Fig. 1 shows in perspective the adaptability of the extension frame or back to any special diagonal angle in the direction of the diagonal axis of the back or along the hypotenuse line extending from the lower left-hand corner to the upper right-hand corner of the said back, or vice versa, commonly termed "cat-a-cornered." The primary advantage of this peculiar angular adjustment is that it secures a more correct rendering of the perspective of any main object, like a view of a railroad wreck, occupying an approximate diagonal position across the focusing plane. The adjustment is made by racking out from the body one side or the other of the extension-back slightly farther than the opposite side, then by means of the pinion at the bottom of the back adjusting the vertical angle of the latter to suit the object to be photographed. This particular method of adjustment is not obtainable in the ordinary center-pivoted side-swing camera, since the center is fixed. In the construction shown the point of intersection of the vertical central axis of the focal plane of the extension-frame with the diagonal axis of said focal plane is shifted to one side or the other of the center along the diagonal axis according as one or the other end of extension-back is moved away from or toward the camera-body, thereby securing accurate focusing and perspective of any special subject to be taken.

Having thus described my invention, I claim as new and desire to secure by Letters Patent—

1. In a camera, a body, an extension-back for the body, adapted to receive a shutter or plate-holder, and bars pivotally connected with the back and having guided movement in the body, one of the bars having a double pivotal connection with the back.

2. In a camera, a body, an extension-back for the body, adapted to receive a shutter or plate-holder, bars having guided movement in the body, one of the bars being pivoted directly to the back, and a swinging member on the back and to which the other bar is jointed.

3. In a camera, a body, an extension-back for the body, adapted to receive a shutter or plate-holder, a pivoted member on the back, and bars adjustable on the body and pivotally connecting the back with the body, one of the bars being pivoted to the member on the back by a pivot at right angles to the pivot of said member.

4. In a camera, a body, an extension-back for the body, adapted to receive a shutter or plate-holder, bars one of which is pivoted directly to the back and both having guided movement in the body, a member pivoted in the back to the pivoted end of which the other bar is pivoted, and means for swinging the said pivoted member.

5. In a camera, a body, an extension-back for the body, adapted to receive a shutter or plate-holder, racks pivotally connected with the extension-back and having guided movement in the body, and pinions mounted in the body and engaging the racks.

6. In a camera, a body, an extension for the body, adapted to receive a shutter or plate-holder, racks pivotally connected with the extension-back and having guided movement in the body, pinions mounted in the body and engaging the racks, and means for adjusting the extension-back to an angle in the direction of its diagonal axis with reference to the body between the top and bottom of the same.

7. In a camera, a body, an extension-back for the body, adapted to receive a shutter or plate-holder, means for connecting the back with the body so that it can be moved toward and from the same, a segmental rack pivoted to the back, and a pinion carried by the back and engaging the said rack.

8. In a camera, a body, an extension-back for the body, adapted to receive a shutter or plate-holder, racks pivotally connected with the sides of the back and having guided movement in the body, pinions mounted in the body and engaging the racks, a segmental rack pivoted to back, and a pinion carried by the back and engaging the segmental rack.

9. In a camera, an extension-back adapted to receive a shutter or a plate-holder, arms mounted for transverse movement in the body of the camera, rack-and-pinion actions for the said arms, a pivotal connection between one arm and the back extension, a segment having hinged connection with the opposing arm, a pivotal connection between said segment and the extension-back, the said segment being provided with teeth, and a pinion supported by the extension-back, engaging with the teeth of the said segment.

10. In a camera, an extension-back adapted to receive a shutter or a plate-holder, arms mounted for transverse movement in the body of the camera, rack-and-pinion actions for the said arms, a pivotal connection between one arm and the extension-back, a segment having a hinged connection with the opposing arm, a pivotal connection between said segment and the extension-back, said segment being provided with teeth, and a pinion supported by the extension-back, engaging with the teeth of said segment, and a locking device for the pinion.

11. In a camera, a body, an extension-back for the body, adapted to receive a shutter or plate-holder, racks one of which is pivoted directly to the back, and both having guided movement in the body, pinions mounted in the body and engaging the racks, a segmental rack pivoted to the back and to which one of the racks is hinged, and a pinion carried by the back and engaging the segmental rack.

12. In a camera, a body, an extension for the body, adapted to receive a shutter or plate-holder, means for connecting the back with the body to permit the back to be moved toward and from the body and at angles thereto, a segmental rack pivoted to the back, a spindle carried by the back, a pinion mounted to turn on the spindle and engaging the segmental rack, and means for locking the pinion from turning.

13. In a camera, a body, an extension for the body adapted to receive a shutter or plate-holder, means for connecting the back with the body to permit the back to be moved toward and from the body and at angles thereto, a rack pivoted to the back, a spindle carried by the back and having a threaded outer end, a tubular carrier on the spindle provided at its inner end with a pinion meshing with the rack and a flange adjacent to the pinion and at its outer end with a button, and a nut on the spindle.

14. In a camera, a box-body, an extension-back for the box-body, adapted for movement to and from the same, arms having guided movement in the box-body, teeth at the lower portions of the arms, spindles, and pinions carried thereby, the pinions being adapted for engagement with the rack-teeth, a shifting pivotal engagement between one of the arms and an end portion of the extension-back, a segment pivotally attached to the opposing side of the said extension-back, having rack-teeth at its lower end, a hinged connection between the said segment and the arm with which it is adapted to be connected, a bracket carried by the extension-back at the side at which the segment is located, a spindle carried by the said bracket, having a threaded outer end, a sleeve mounted on the said spindle, a pinion on the sleeve, engaging with the teeth of the segment, an annular flange on the said sleeve, adapted for frictional engagement with the said segment, a button for operating the said sleeve, and a jam-nut at the threaded end of the spindle, adapted to force the flange of the sleeve into engagement with the said segment and prevent accidental rotation of the pinion and consequent accidental displacement of the extension-back from its adjusted position, as described.

In testimony whereof I have signed my name to this specification in the presence of two subscribing witnesses.

WILLIAM F. FOLMER.

Witnesses:
J. FRED. ACKER,
JNO. M. RITTER.